(12) United States Patent
Krishnasamy et al.

(10) Patent No.: US 10,754,599 B1
(45) Date of Patent: Aug. 25, 2020

(54) SYSTEM AND METHOD FOR PRINTING AND REUSING CUSTOMIZED SAMPLE SETS WHILE PRINTING DOCUMENTS

(71) Applicant: XEROX CORPORATION, Norwalk, CT (US)

(72) Inventors: Muralidaran Krishnasamy, Chennai (IN); Sainarayanan Gopalakrishnan, Chennai (IN); Narayan Kesavan, Chennai (IN); Sathish Kumar Annamalai Thangaraj, Chennai (IN)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 16/354,769

(22) Filed: Mar. 15, 2019

(51) Int. Cl.
*G06F 3/12* (2006.01)
*H04N 1/00* (2006.01)

(52) U.S. Cl.
CPC ............ *G06F 3/126* (2013.01); *G06F 3/1205* (2013.01); *G06F 3/1256* (2013.01); *H04N 1/00413* (2013.01)

(58) Field of Classification Search
CPC .............................. G06F 3/126; G06F 3/1205
See application file for complete search history.

(56) References Cited

U.S. PATENT DOCUMENTS

| | | | |
|---|---|---|---|
| 5,164,842 A | | 11/1992 | Gauronski et al. |
| 5,930,393 A | * | 7/1999 | Ho ....................... G06K 9/6807 382/170 |
| 6,035,103 A | * | 3/2000 | Zuber ................... G06F 3/1211 358/1.9 |
| 6,873,426 B1 | * | 3/2005 | Farrell .................... B42C 19/00 270/52.02 |
| 7,596,244 B2 | | 9/2009 | Farrell |
| 9,501,679 B2 | | 11/2016 | Doraiswamy et al. |
| 9,706,064 B2 | | 7/2017 | Zehler et al. |
| 2005/0219560 A1 | * | 10/2005 | Bratnober ................ B42C 1/00 358/1.5 |
| 2005/0276641 A1 | * | 12/2005 | Morita ................. G03G 15/655 399/382 |
| 2009/0122326 A1 | * | 5/2009 | Chiba ................ H04N 1/00392 358/1.9 |
| 2009/0268224 A1 | * | 10/2009 | Takahashi ............. G06F 21/608 358/1.14 |
| 2013/0250361 A1 | * | 9/2013 | Minegishi .......... G06K 15/1848 358/1.18 |
| 2015/0371126 A1 | * | 12/2015 | Ota ...................... G06K 15/408 358/1.14 |
| 2017/0094075 A1 | * | 3/2017 | Zehler ................... G06F 3/1203 |

\* cited by examiner

*Primary Examiner* — Ibrahim Siddo
(74) *Attorney, Agent, or Firm* — Jones Robb, PLLC

(57) ABSTRACT

Systems, methods, and devices are configured to print and reuse customized sample sets while printing documents. They include receiving instructions to retrieve an electronic document and processing the electronic document in a sample print mode. The electronic document are arranged in a plurality of page with each page containing readable information. They further include identifying a subset of pages of the electronic document to print in a first phase of the sample print mode and printing the subset of pages on a physical readable media in the sample print mode. They additionally include displaying a message on a user interface after completion of the first phase of the sample print mode and printing remaining pages of the electronic document on a physical readable media in response to user input based on the displayed message.

18 Claims, 8 Drawing Sheets

SYSTEM AND METHOD FOR PRINTING AND REUSING CUSTOMIZED SAMPLE SETS WHILE PRINTING DOCUMENTS

TECHNICAL BACKGROUND

Networked printer systems allow a user to submit a print job for an electronic document to a queue or server that can subsequently be printed using one of a large number of different printers. The arrangement allows a user to walk to any one of the supported printers and select the job to be printed. In some print job configurations, an option exists for printing one or more test pages of the documents in order to evaluate the quality of printing or to determine if the document is printed in the proper form or format. The test pages may be helpful to identify an incompatibility between the print document generated by a print driver and the resulting print output from the printer for the electronic document. In some cases, a test mode may further be available that includes printing some or all of the document using a lower print quality.

Typically, one of the motives for printing test pages is to allow the user to decide whether to proceed with the print job on that printer or not. However, in many cases, the pages printed as test pages are not selectable by the user and may not be representative of the most challenging pages to print or the most important pages in terms of printing quality for the user. Regardless of the purpose for, and the result of, printing test pages, the test pages that are printed are not useable or even configurable to be made usable as part of printing the final version of the electronic document. As a result, when usable print output is finally produced, the user may have to proceed through the steps of resubmitting the print job to the print queue or printer to print the entire document. Further, if the print job has a large number of pages, the number of test pages, if not user selectable, may also be large, leading to increased use of paper or printable media and excess waste. The problem is further compounded if the user decides to create and request the same print job on multiple printers to evaluate the quality and all remain unsatisfactory. The user may additionally have to create a new or different print job for each submission to a different printer in order to address any printer compatibility issues described above. Therefore, there is a need to create a mechanism for printing test or sample pages of an electronic document evaluate print quality issues that do not result in unnecessary expense and waste of printing resources as well as materials, such as ink or and paper or other printable media.

Overview

Exemplary embodiments described herein include methods, systems, and apparatuses for printing and reusing customized sample sets while printing a document. An exemplary printing apparatus includes a printing engine that prints information on a physical readable medium. The printing apparatus also includes a print processor that receives instructions to retrieve an electronic document from a print queue and to process the electronic document in a sample print mode. The electronic document is arranged in a plurality of pages with each page containing readable information. The print processor further sends information for an identified subset of the plurality of pages of the electronic document to print using the print engine in a first phase of the sample print mode. The printing apparatus also includes a user interface that displays a message regarding the printing of the electronic document after the first phase of the sample print mode is complete. The print processor further provides remaining pages of the electronic document to print using the print engine in a second phase of the sample print mode in response to user input based on the message.

An exemplary apparatus includes a memory for storing a electronic document. The electronic document is arranged in a plurality of pages with each page containing readable information. The apparatus further includes a processor configured to process the electronic document retrieved from the memory in a sample print mode based on a first user input. The processor also sends instructions to print a subset of pages of the electronic document on a physical readable media in a first phase of the sample print mode. The subset of pages of the electronic document are identified based on a second user input. The processor additionally sends instructions to print remaining pages of the electronic document on the physical readable media in a second phase of the sample print mode. The instructions to print remaining pages are sent in response to a third user input based on a message displayed at the completion of printing in the first phase of the sample print mode.

An exemplary method includes receiving instructions to retrieve an electronic document. The electronic document is arranged in a plurality of pages with each page containing readable information. The method also includes receiving a command to process the electronic document in a sample print mode. The method additionally includes identifying a subset of pages of the electronic document to print in a first phase of the sample print mode and printing the subset of pages on a physical readable media in the sample print mode. The method further includes displaying a message on a user interface after completion of the first phase of the sample print mode and printing remaining pages of the electronic document on a physical readable media in response to user input based on the displayed message.

BRIEF DESCRIPTION OF THE DRAWINGS

These and other aspects, features, and advantages of the present disclosure will be described or become apparent from the following detailed description of the preferred embodiments, which is to be read in connection with the accompanying drawings.

Figure 1:
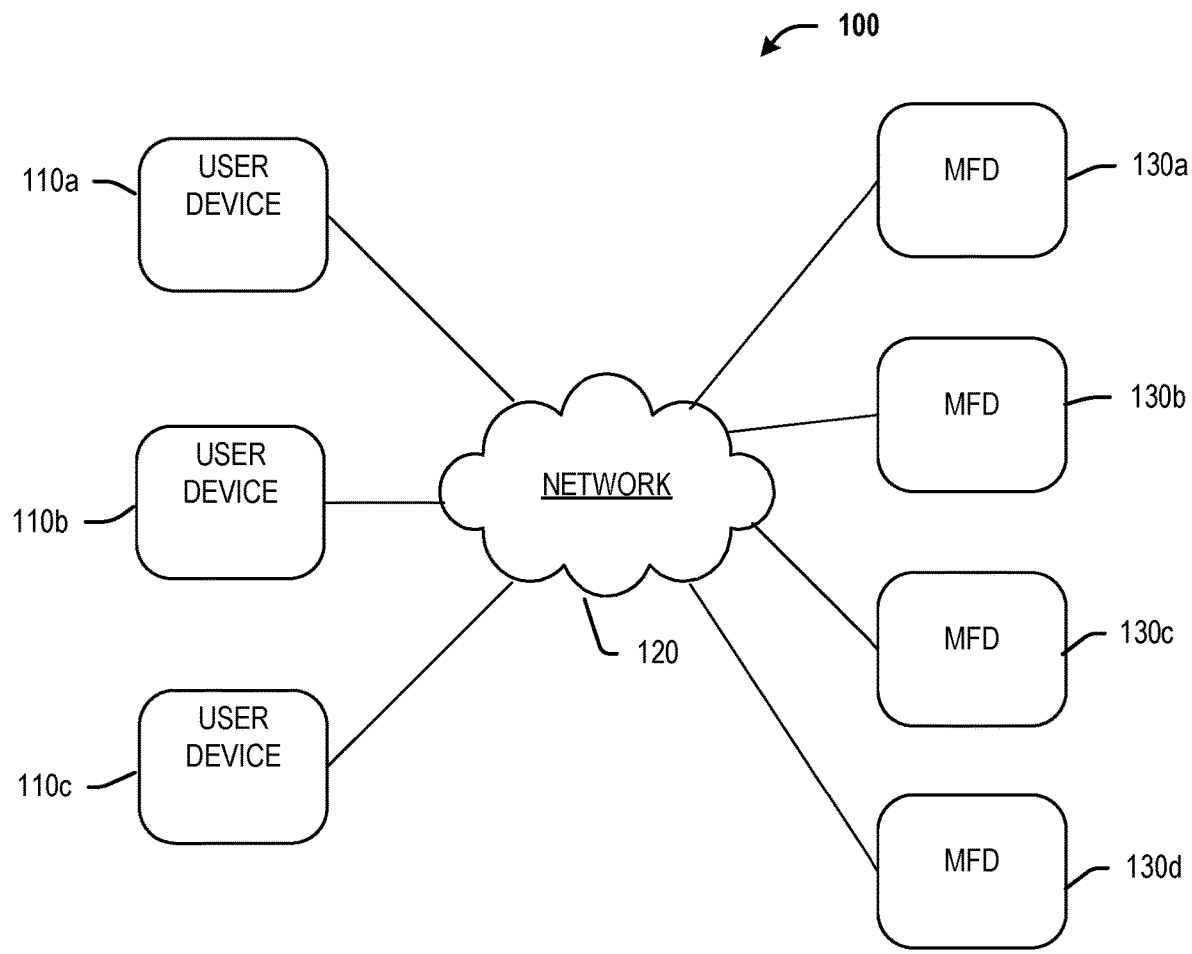
FIG. 1 depicts an exemplary system for printing and reusing customized sample sets while printing documents.

It should be understood that the drawing(s) are for purposes of illustrating the concepts of the disclosure and are not necessarily the only possible configuration for illustrating the disclosure.

DETAILED DESCRIPTION

In some embodiments described herein, a printing apparatus is used to perform one or more of the aspects of present disclosure describing printing and reusing customized sample sets while printing documents. The printing apparatus includes a printing engine that prints information on a physical readable medium. The printing apparatus also includes a print processor that receives instructions to retrieve an electronic document from a print queue and to process the remote electronic document in a sample print mode, the remote electronic document arranged in a plurality of pages, each page containing readable information, the print processor further sending information for an identified subset of the plurality of pages of the electronic document to print using the print engine in a first phase of the sample print mode. The printing apparatus further includes a user interface that displays a message regarding the printing of the electronic document after the first phase of the sample print mode is complete. Finally, the print processor in the printing apparatus provides the remaining pages of the remote electronic document to print using the print engine in a second phase of the sample print mode in response to user input based on the message. The printing apparatus may include additional electrical elements used in conjunction with general electronics and printing technology as well as specific electrical elements necessary for operation in specific types of wired and/or wireless communication networks. The print processor further may include one or more processors as well as other elements necessary to perform the various operations as described herein.

In some embodiments, the displayed message may include a user selection menu to select one printing option from at least one of continue printing in a second phase, cancel printing, or transfer printing of the electronic document to a different printer apparatus to begin printing in the first phase of the sample print mode in the different printer apparatus. Further, in some embodiments, the electronic document and information associated with the identified subset of the plurality of pages in the electronic document are electronically communicated to the different printer apparatus when the printing option to transfer the electronic document to a different printer is selected.

In some embodiments, the user interface displays a second message including a user selection menu for identifying the subset of the plurality of pages in the electronic document, the selection menu including an entry for user selection of the pages in the subset and an entry for automatic selection of pages in the subset. Additionally, in some embodiments, the entry for user selection of the pages in the subset includes a user selection for a percentage of all the pages in the electronic document. Further, in some embodiments, the entry for automatic selection of pages in the subset includes selecting the pages in the subset based on a determination of white area on a page.

In some embodiments, the displayed message includes a message to insert the printed subset of page from the first phase of the sample print mode in a page collating mechanism attached to the print engine, and wherein the print engine further collates the subset of pages that were printed in the first phase with the remaining pages printed in the second phase while printing the remaining pages of the remote electronic document in the second phase of the sample print mode.

In some embodiments described herein, an apparatus may be included to perform one or more of the aspects of the disclosure described by the various embodiments herein. The apparatus includes a memory for storing an electronic document, the electronic document arranged in a plurality of pages, each page containing readable information. The apparatus further includes a processor configured to process the electronic document retrieved from the memory in a sample print mode based on a first user input, send instructions to print a subset of pages of the retrieved electronic document on a physical readable media in a first phase of the sample print mode, the subset of pages of the retrieved electronic document identified based on a second user input and send instructions to print the remaining pages of the retrieved electronic document on the physical readable media in a second phase of the sample print mode, the instructions being sent in response to a third user input based on a message displayed at the completion of printing in the first phase of the sample print mode. The apparatus may include additional electrical elements used in conjunction with general electronics and printing technology as well as specific electrical elements necessary for operation in specific types of wired and/or wireless communication networks. The processor may further be embodied as one or more processors and may include other elements necessary to perform the various operations as described above. The memory may include additional elements, including but not limited to, a data storage element, and a memory for storing program instructions. The memory or similar element may provide the program instructions to the processor in order to execute the various mechanisms in the embodiments described herein.

In some of the embodiments disclosed herein, a method or process is described that utilizes a mechanism for printing and reusing customized sample sets while printing documents. The process includes receiving instructions to retrieve an electronic document, the electronic document arranged in a plurality of pages, each page containing readable information, receiving a command to process the electronic document in a sample print mode, identifying a subset of pages of the electronic document to print in a first phase of the sample print mode, printing the subset of pages on a physical readable media in the sample print mode, displaying a message on a user interface after completion of the first phase of the sample print mode, and printing the remaining pages of the electronic document on a physical readable media in response to user input based on the displayed message. The process may further include other aspects and mechanisms of the present disclosure as described herein.

The implementation of one or more of the aspects of the processes, mechanisms, systems, and devices of the present embodiment provides the ability to select a custom set of pages for printing prior to printing an entire electronic document. The custom set may be chosen from the range of pre-determined percentages, a user-defined page range, or through one or more automatic selection processes, allowing the user to choose a set that may better evaluate the print quality for the printed output. In some embodiments, if the user is not satisfied with the sample set, an electronic document transfer mechanism is provided to transfer the electronic document along with specific information associated with the electronic document to another printer allowing evaluate print quality on that printer without restarting the printing process and reentering all of the information for creating the printing job. Finally, some embodiments include a mechanism to incorporate the printed pages from the custom set (e.g., the set that may represent the best quality printing at a printer) during the printing process for the remaining pages of the electronic document. Any or all of these aspects reduce or eliminate print media or paper waste as well as reduce unnecessary printing resource and printing material use.

These and additional operations are further described with respect to the embodiments depicted in FIGS. 1-8 below.

FIG. 1 illustrates an exemplary system 100 for printing and reusing customized sample sets while printing documents. System 100 includes a plurality of user devices 110a-110c coupled to a plurality of multiple function devices (MFDs) 130a-130d through a network 120. User devices 110a-110c and MFDs 130a-130d may be located throughout sites within the same building or dwelling and connected through one or both of a wired and wireless local area network using a communication protocol including, but not limited to, Institute of Electrical and Electronics Engineers (IEEE) standard 802.3, Wi-Fi, and IEEE standard 802.11. One or more of user devices 110a-110c may additionally be located in a different or remote facility from the dwelling or building where the one or more of the MFDs 130a-130d are located. The one or more remotely located user devices 110a-110c may be communicatively coupled to the one or more MFDs 130a-130d through a private or public network using a communication protocol including, but not limited to, Internet Protocol or any cellular communication protocols.

In operation, system 100, using a combination of one or more of the user devices 110a-110c and MFDs 130a-130c performs various aspects of a mechanism for printing and reusing customized sample sets while printing documents. The mechanism includes receiving instructions at one of the devices (e.g., users devices 110a-110c or MFDs 130a-130d) to retrieve an electronic document and, if necessary, initiate a printing job for the retrieved electronic document. The electronic document is, for example, arranged in a plurality of pages with each page containing readable information. In some embodiments, the instructions may be provided by one of the user devices 110a-110c and communicated to one of the MFDs 130a-130d. The mechanism further includes receiving a command at the same one of the MFDs 130a-130d to process the electronic document in a sample print mode. The command may include information identifying a subset of pages of the electronic document to print in a first phase of the sample print mode. In some cases, the command may be provided by the one of the user devices 110a-110c, while in other cases, the command may be entered directly (e.g., through a user interface) on the one of the MFDs 130a-130d.

The one of the MFDs 130a-130d in system 100 prints the subset of pages on a physical readable media in the sample print mode. Once printing of the subset of pages is complete, a message is displayed on a user interface included on the one of the user devices 110a-110c and/or the one of the MFDs 130a-130d. The one of the MFDs 130a-130d prints the remaining pages of the electronic document on a physical readable media in response to a user input based on the displayed message. In some embodiments, a message is further displayed (e.g., on the one of the MFDs 130a-130d) to insert the printed subset of pages in a paper tray holder included on the one of the MFDs 130a-130d to allow the one of the MFDs 130a-130d to collate the printed subset of pages during the printing of the remaining pages of the electronic document. By including a mechanism to include the printed pages from the sample set with the printing of the remaining pages, a custom sample set that may best represent an assessment of print quality may be printed and reused resulting in eliminating paper waste as well as reducing unnecessary printer resource and material use.

In some embodiments, a selectable option may be included in a message displayed on a user interface (e.g., on the one of the user devices 110a-110c and/or the one of the MFDs 130a-130d) to transfer (e.g., electronically through a communication network) the electronic document and associated printing information (e.g., the subset of pages for sample printing) to a different one of the MFDs 130a-130d. By providing an electronic transfer mechanism and including the information associated with the electronic document, the user may evaluate print quality on the different one of the MFDs 130a-130d without restarting the printing process and reentering all of the information as part of creating a new printing job.

The user devices 110a-110c may be any one of a personal computer, a laptop computer, a computer network terminal, a tablet, a cellular phone, a smartphone, and the like. User devices 110a-110c may include processors, displays, communication interfaces, user interfaces, and memories, along with various program modules stored in a memory and executed by a processor, to implement specific functions, such as print servers, print drivers, graphic user interface menus, and communication protocols. MFDs 130a-130d may be any one of a printer, a printer/fax machine, a printer/scanner machine, and the like. MFDs 130a-130d may include one or more processors, a printer mechanism, mechanical printing media processors, a network interface, a user interface, and storage elements, along with various program modules stored in the storage elements and executed by the one or more processors. Details related to devices similar to User devices 110a-110c and MFDs 130a-130d will be described in further detail below.

Figure 2:
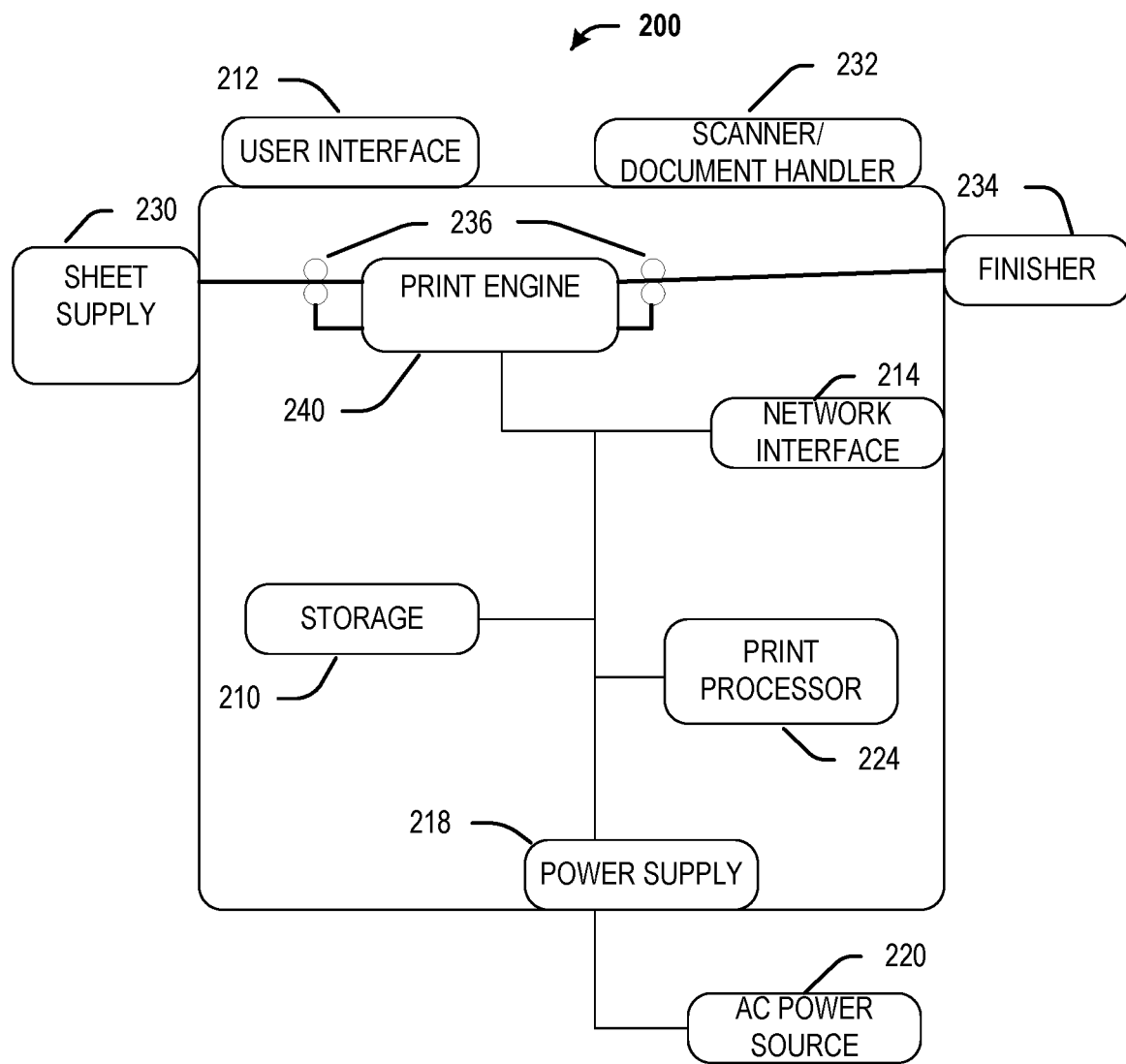
FIG. 2 depicts an exemplary printing device for printing and reusing customized sample sets while printing documents.

FIG. 2 illustrates an exemplary printing device 200, which can be used with systems and methods for printing and reusing customized sample sets while printing documents. Printing device 200 may operate in a manner similar to MFDs 130a-130d described in FIG. 1. Printing device 200 may also be embodied as, or incorporated in, a printer, copier, multi-function machine, or other device that includes the capability to print an electronic document on a physical printable and/or readable media, such as paper. Printing device 200 includes a marking device or printing engine 240 capable of printing markings on sheets of print media, a print processor 224 operatively coupled to the printing engine 240, a user interface 212 operatively coupled (not shown) to the print processor 224, and a network interface 214 operatively coupled to the print processor 224 and printing engine 240. A storage element 210 is also operatively coupled to network interface 214, print processor 224, and printing engine 240. Printing engine 240 is also operatively coupled to sheet supply 230, scanner/document handler 232, media path 236, and finisher 234. Power supply 218 receives input from power source 220 and provides power to components in printing device 200 including storage 210, network interface 214, print processor 224, and printing engine 240. Other elements may be included in printing device 200 but are not described here in the interest of conciseness.

In operation, user interface 212 receives instructions to retrieve an electronic document maintained within a print queue either in storage 210 or in an external print server in the network. The print processor 224 retrieves the electronic document based on input received from user interface 212.

The instructions may also include additional information associated with printing the electronic document. Print processor 240 may also be referred to as an image processor and operates in a different manner than a general purpose processor because it is specialized for processing image data. A printing mechanism is initiated by instructions in signals communicated from print processor 224 to printing engine 240. Media path 236 is positioned to supply continuous media or sheets of print media (e.g., paper, cardstock, or velum) from sheet supply 230 to the marking device(s) included in printing engine 240. After printing engine generates and applies various markings to sheets of print media, the sheets may optionally pass to finisher 234 which can flip, fold, staple, sort, collate etc., the various printed sheets based on the additional information associated with printing the electronic document.

Printing engine 240 may include any marking device that applies a marking material (e.g., toner, inks, etc.) to continuous print media or sheets of print media, whether currently known or developed in the future and can include, for example, devices that use a photoreceptor belt or an intermediate transfer belt or devices that print directly to print media (e.g., inkjet printers, ribbon-based contact printers, etc.). Scanner/document handler 232 may be used for feeding or re-feeding (e.g., in duplex print mode) printed media sheets, either automatically or manually with inputs from a user, in any of the printing, scanning or faxing modes available. Sheet supply 230 may include one or more trays for storing and positioning printable media for entry onto media path 236. Sheet supply 230 may include a bypass tray that allows external print media, such as previously printed pages to be added and entered into media path 236 for marking instead of, or in addition to, any printable media already in sheet supply 230.

As part of the printing function in printing device 200, user interface 212 displays a menu including print options for the retrieved document to be printed. User interface 212 may receive instructions for displaying this menu as well as other menus and messages from print processor 224. Included in the print options menu may be a full print option. If the full print option is selected (e.g., based on user input through user interface 212), print engine 240 prints the fully printed document based on the retrieved electronic document. Print processor 224 may provide any instructions for printing documents to print engine 240.

In addition, user interface 212 in printing device 200 may display a print sample set option in the print options menu. Based on the user interface 212 receiving a user input selecting the print sample set option, user interface 212 displays sample set selection menu. The sample set selection menu may include a series of selection options including a pages selection option, a document percentage selection option, and one or more automatic (e.g., by the printing device) option options.

The page selection option may allow a user to select or enter (e.g., type in) a subset of one or more pages of the electronic document as the sample set by entering the page numbers individually or as a group. The page selection option may also allow a user to select even or odd pages in the electronic document as the sample set, which may be useful when printing in duplex mode, especially if the printed sample pages are incorporated or collated in with any printing of pages in the electronic document that are not part of the sample set in a manner similar to that described above.

The percentage of document selection option may allow a user to select a percentage of the document to include as part of the sample set. The option may include pre-defined percentages for the sample set, such as 10 percent, 20 percent, and 50 percent of the pages in the electronic document. The user may select one of these options or may enter (e.g., type in) a percentage value from 1 percent to 99 percent. Once the percentage is selected or entered, print processor 200 determines the pages to be included in the sample using the following equations:

$$x=(p/100)*n \text{ [Rounded off to the next whole number]}$$

where x is the number of pages to be printed in sample set,
p is the selected or entered percentage of pages of the electronic document to be printed, and
n is the number of pages in the electronic document selected for printing The automatic selection option may allow the user to use tools, such as a document analysis program, present either in the printing device 200 or in a user device (e.g., one of the user devices 110a-110c devices described in FIG. 1) to select pages for the sample set based on several possible properties. For example, a random selection option may be available, that selects the pages in some random sequence. In another example, a marking content selection option may be available that chooses pages with high amounts of marking content or alternatively low amounts of white space on the pages. In still other examples, a color content selection option or a picture/text content selection option may be available. Various mathematical and statistical processes may be used as part of determining and generating the pages used in the sample set for any of the selection option choices associated with an automatic selection option.

Once the selection of the sample set is made on user interface 212 in printing device 200, printing engine 240 (e.g., based on instructions from print processor 224) begins, in a first step or phase, printing the sample set of pages from the electronic document based on the sample set selection that was made. As part of printing in the first step or phase, print processor 224 may also determine whether the media printing mode is simplex or duplex. Print processor 224 further instructs the print engine 240 on how to proceed with printing the sample set based on the selection of the sample set and the media printing mode.

In simplex mode, printing sample sets for either page selection or automatic selection requires the print processor 224 to instruct print engine 240 to print the pages as if they were in order (i.e., numerical order). However, if the percentage of document selection is chosen, print engine 240 prints the sample set of pages by printing every Sth page until x pages are printed or until there are no additional pages to print for the electronic document where S is equal to the following:

$$S=n/x \text{ [Rounded off to the next whole number]}$$

In duplex mode, printing sample sets for either page selection or automatic selection may include having the print engine 240 (e.g., based on instructions from print processor 224) print the pages based on whether the page number (e.g., the page number within the original electronic document or the page number established by the print job) is an even or odd page. Based on printing order of the pages, odd pages are printed on a first or front side of a sheet of print media (e.g., paper) while even pages are printed on the second or back side. However, if the percentage of document selection is chosen, print engine 240 prints the sample set of pages by printing every (D−1)th page in pairs (to account for duplex printing) until x pages are printed or there are no more pairs to print, whichever comes first, where D is governed by the following:

$$D=(n/x)*2 \text{ [Rounded off to the next whole number]}$$

It is important to note that other printing control algorithms may be also used for printing the sample set of pages, depending on the media printing mode and the sample set selection option made by the user. Once the sample set of pages is printed, print engine 240 ceases printing and user interface 212 displays a menu to select the next step or phase of printing. The next step menu may include several selection options including, but not limited to, cancel further printing of the electronic document, continue printing the remainder of the electronic document, and transfer or move the electronic document and associated information to a different printing device, as described earlier.

If the continue printing option is selected from the displayed menu, the user interface 212 may display another message instructing the user to insert the printed sample set in the bypass tray included in sheet supply 230 and additionally display an acknowledgment entry. Once the printed sample set is inserted and acknowledgment is made, print engine 240 begins printing the remaining pages of the electronic document. Print processor provides instructions to print engine 240 indicating the proper printing order for the remaining pages of the electronic document and when to incorporate the print media sheets used for the pages of the printed sample set from the bypass tray. The instruction also includes which print media sheets used for the pages of the printed sample set to apply additional markings to as necessary (e.g., in duplex mode). Storage 210 may maintain information, such as a data file, including specific data associated with the printing of the electronic document, including the sample printing option chosen, the media printing mode, the selected pages for the sample set, and which step or phase of printing in the sample printing mode has or hasn't been completed.

Figure 3:
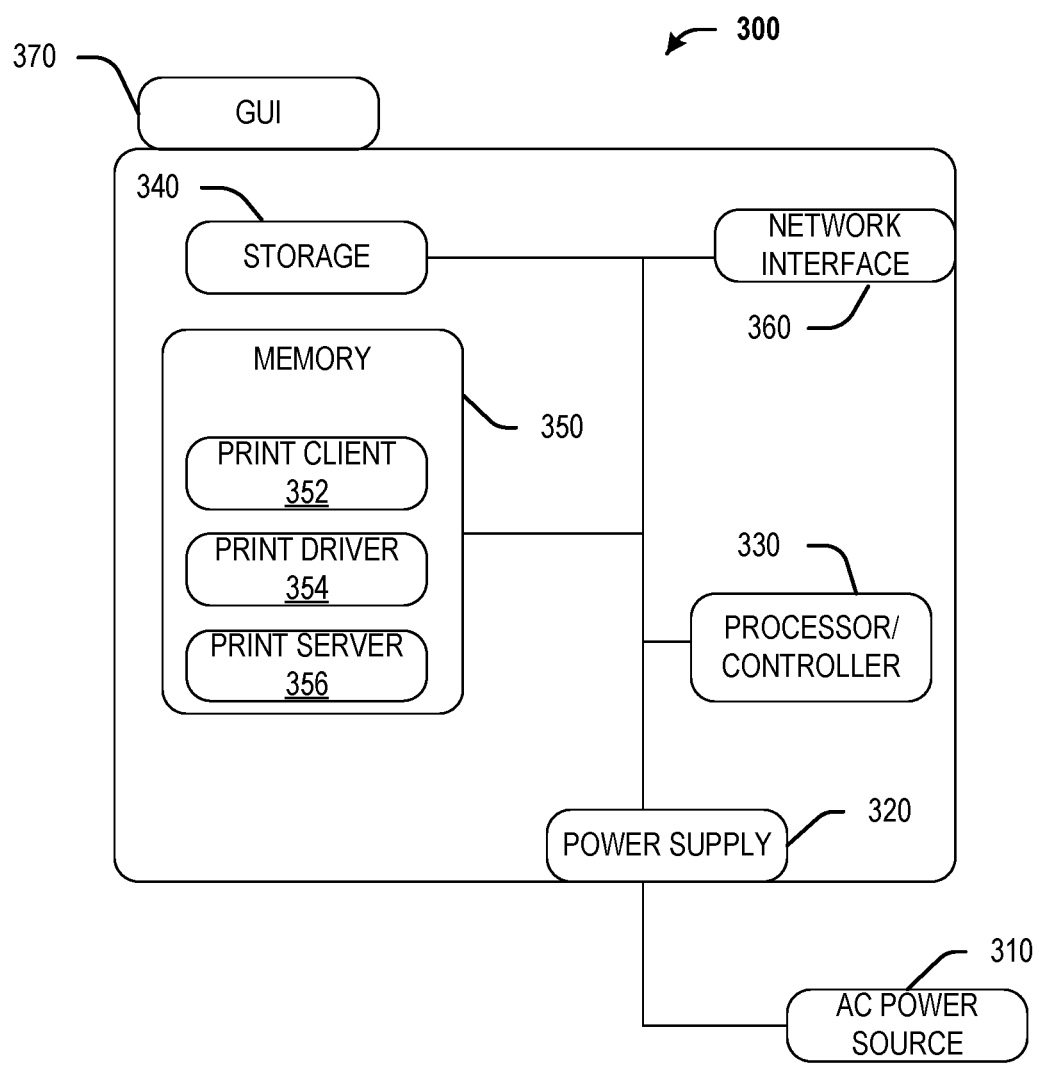
FIG. 3 depicts an exemplary user device for printing and reusing customized sample sets while printing documents.

FIG. 3 illustrates an exemplary user device 300 which can be used with systems and processes for printing and reusing customized sample sets while printing documents User device 300 may operate in a manner similar to user devices 110a-110c described in FIG. 1. Further, some or all of the elements of user device 300 may be included as part of a printer or MFD, such as printing device 200 in FIG. 2 or MFDs 130a-130d in FIG. 1. User device 300 may also be embodied as, or incorporated as part of, a print server, a personal computer, a tablet, a smartphone, a portable computing device, etc. User device 300 includes a controller/processor 330 operatively coupled to a network interface 360, storage 340, and memory 350. Controller/processor 330 is also operatively coupled (not shown) to graphical user interface (GUI) 370. Power supply 320 receives input from power source 310 and provides power to components in user device 300 including storage 340, memory 350, network interface 360, and processor/controller 330. Other elements may be included in user device 300 but are not described here in the interest of conciseness.

Network interface 360 is used for communications to and from user device 300 and comprises one or both of a wired or wireless connection and circuitry to support one or more communication protocols including, but not limited to, IEEE802.11, Ethernet, and cellular networks. Processor/controller 330 controls the various actions, computations, functions, and processes, including various aspects of the embodiments described herein, by receiving inputs and providing instructions to the various elements within user device 300 or within a device incorporating user device 300. Processor/controller 330 may also receive inputs and provide instructions to other devices, such as printer device 200, in order to control aspects of the other devices, including the various aspects of the embodiments described herein, through network interface 360.

A storage element 340 provides storage for information and data (e.g., electronic documents prior to selection for printing) created or used by user device 300. Storage element 340 may include large storage capacity elements, such as optical, magnetic, capacitor based elements that are writeable and readable by processor/controller 330. GUI 370 provides one or more interface elements to interact with a user. GUI 370 may include one or more of a keyboard, mouse, voice detector or microphone, and touch pad in which to enter instructions from a user. GUI 370 may additionally include a speaker or display in which to convey messages, instructions, and menu options to the user.

Memory 350 includes storage for various software program modules used in conjunction with managing electronic documents for printing as part of a printing device, such as printing device 200 in FIG. 2 or MFDs 130a-130d in FIG. 1. Memory 350 includes a module for a print client 352, which can be a mobile client, desktop client, email client, etc. Print client 352 submits print jobs through a print server, such as print server module 356. Memory 350 also includes a print driver 354 that converts a source document, such as an electronic document produced using a word processing program on user device 300, print-ready electronic document. The source document may be, for example, a .pdf file, .doc file, .jpeg picture, .txt file, etc., that a user wishes to print, while the print-ready document is a rasterized document (e.g., bitmap document) or printer specific document that a printer (e.g., printing device 200) can print without further processing. Print server 356 accepts the print job from the print client 352, and the electronic document is queued as a print job until the user requests the print job be printed at a specific printer (e.g., printing device 200).

It is important to note that each printer may have different requirements for the format of the electronic document to be printed. As such, each of these requirements and formats must typically be loaded into memory 350, usually as part of print driver 354. Further, each printer may also maintain separate printing queues in print server 356. Including print server 356 in user device 300, including when user device 300 is incorporated in a printer such as printing device 200, allows a user to effortlessly begin printing the electronic document on a different printer without requiring the user to reload the remote electronic document or start a new print job.

Print client 352 may also include code to display messages and menus in GUI 370 associated with printing an electronic document. In some embodiments, print client 352 may include code to display a menu for selecting a full or regular print mode or a sample print mode. Print client 352 may include code to display a menu for selecting a subset of pages of the electronic document as part of the sample print mode option and further includes selection options such as those described earlier. Finally, print client 352 may include code to display a menu for confirming acceptance of the quality of the printed subset of pages in the sample print mode and provide a set of further processing options such as those described earlier.

Figure 4:
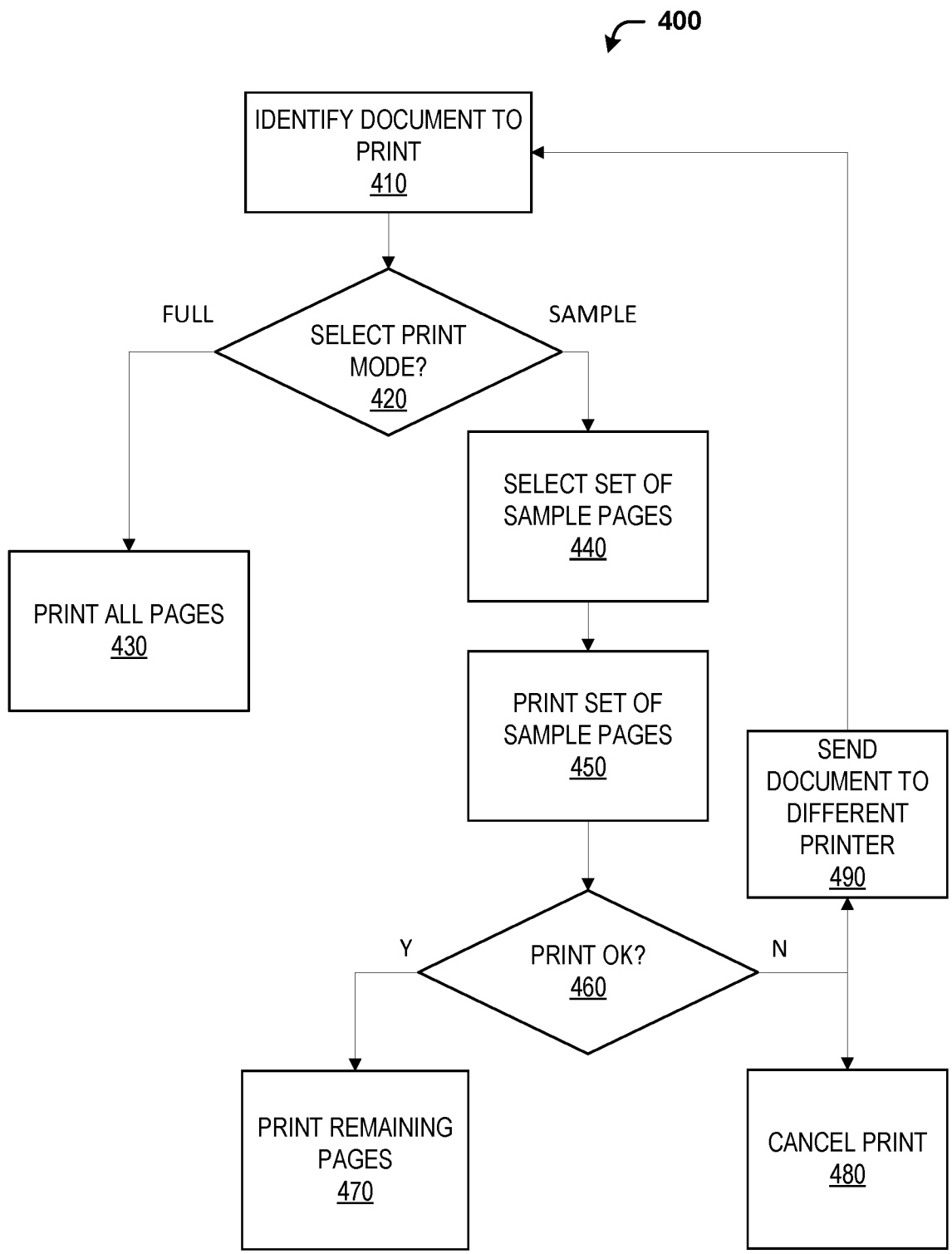
FIG. 4 depicts an exemplary process for printing and reusing customized sample sets while printing documents.

FIG. 4 depicts an exemplary process 400 for printing and reusing customized sample sets while printing documents. Process 400 is primarily described with respect to a printing device, such as printing device 200 described in FIG. 2. The printing device may also include a user control device, such as user device 300 described in FIG. 3. Process 400 may also be performed by a printer in combination with other functions, such MFDs 130*a*-130*d* described in FIG. 1. In other embodiments, some or all of the elements of process 400 may be implemented in a user device connected to a printer or MFD, such as user device 300. Although process 400 depicts steps performed in a particular order for purposes of illustration and discussion, the operations discussed herein are not limited to any particular order or arrangement. One skilled in the art, using the disclosures provided herein, will also appreciate that one or more of the steps of process 400 may be omitted, rearranged, combined, and/or adapted in various ways.

At step 410, an electronic document is identified for printing using a device (e.g., printing device 200). The electronic document may be arranged in some structured arrangement, such as a plurality of pages, with each page containing readable information, such as pictures, figures, and text. may be identified by a user on a user interface on the printing device (e.g., GUI 212). As part of the identification, at step 410, the electronic document may be retrieved from a memory, such as storage 210 in printing device 200. The electronic document may also be identified, at step 410, on a user device (e.g., user device 300) using a print driver (e.g., print driver 354) and may further be retrieved from a memory in user device 300, processed as described above, and provided to printing device 200. The electronic document may also be identified in, and retrieved from, a print server device located remotely from the printing device.

After the electronic document is identified and/or retrieved, at step 410, a message is displayed on a user interface (e.g., GUI 212), at step 420, for selecting a print mode. In some embodiments, two print mode options are displayed, a full print mode and a sample print mode. In other embodiments, additional print modes may also be included in the list of selections.

If, based on input from the user, the full print mode is selected at step 420, then, at step 430, all of the pages of the retrieved electronic document requested by the user to print are printed. Process 400 is complete after completion of printing all the pages.

If, based on input from the user, the sample print mode is selected at step 420, then at step 440, a different message is displayed on the user interface (e.g., GUI 212) for selecting the set of samples pages. The message may allow a user to select or enter (e.g., type in) a subset of one or more pages of the electronic document as the sample set by entering the page numbers individually or as a group. The message may also allow a user to select or enter a percentage of the electronic document as part of the sample set. The message may further allow a user to select one or more automatic or computationally derived selection algorithms to generate the page selection of the sample set for the electronic document. For example, a random selection option may be available, that selects the pages in some random sequence. In another example, a marking content selection option may be available that chooses pages with high amounts of marking content or alternatively low amounts of white space on the pages. In still other examples, a color content selection option or a picture/text content selection option may be available. Any of these selections may utilize any of the sample set generation and management aspects of the present disclosure described above.

After the sample set of pages of the retrieved electronic document are selected at step 440, the sample set of pages are printed in the printing device 200, at step 450. The printing of the sample set of pages may be considered a first phase of printing the electronic document.

Once the sample set of pages are printed, at step 450, then, at step 460, another message is displayed on the user interface (e.g., GUI 212) to select whether the quality of the printed sample set of pages is okay and acceptable to the user. If, after input from the user, the printing of the sample set of pages is okay and acceptable, then, at step 470, the remaining pages of the retrieved electronic document requested by the user are printed, as part of printing the electronic document in the sample print mode. The printing of the remaining pages, some portion of or all the pages not previously printed as the sample set may be considered a second phase of printing the electronic document. In some embodiments, an additional message is displayed on the user interface instructing a user to insert the printed sample set of pages from the first phase in a tray (e.g., a bypass tray included in sheet supply 230). The printed sample pages may then be incorporated with the printing of the desired remaining pages as described above. The incorporation of the printed sample set of pages with the printing of the remaining pages provides a complete set of printed pages with minimal waste of materials, such as print media and ink or toner used by printing device 200. Process 400 is complete when any of the remaining pages of the retrieved electronic document are retrieved whether it be the entire retrieved electronic document or some portion of the document that is necessary to complete the print job.

If, at step 460, the printing of the sample set of pages is not acceptable, then, one of two or more alternative selection options for the second phase of printing in the sample print mode may be selected by the user. In a first alternative based on an input from the user, at step 480, the printing job is canceled. The retrieved electronic document may be removed from memory (e.g., storage 210) and in some instances, the printing job for the electronic document may be removed from a printer queue or print.

As a second alternative option for the second phase of printing in the sample print mode based on an input from the user, at step 490, the retrieved electronic document is sent or transferred to a different printer. Process 400 continues with a return identifying and retrieving the electronic document for printing in the new printer, at step 410. In some embodiments, the transfer may be a direct transfer of the electronic document and associated information, as a print job, from the current printer to a different new printer using a local network coupling the two printers as described earlier. In some embodiments, the transfer may be an indirect transfer. For example, the electronic document is returned, or transferred back, to a printer queue or print server where it may be assigned to a new printer. The electronic document may also be returned to a user device (e.g., user device 300) for any additional processing in a print driver (e.g., print driver 354) needed to print on the new printer.

It is important to note that creating and managing a print job in a printer queue or print server, such as print server 356 described in FIG. 3, may include additional management activity when printing electronic documents in a process, such as process 400, that includes a sample print option such as described herein. In some embodiments, a print job for an electronic document created using software modules, such as print client 352, print driver 354 and printer server 356 described in FIG. 3, and using a sample print mode may be considered to have a pending status during as well as after completion of printing the sample set of pages in the first step or phase of printing, at step 450. The pending status remains while printing the remaining pages of the document if the printed sample pages are acceptable and printing is continued in the second phase, at step 470. However, a status change may be entered if the printed sample pages are not acceptable and printing is either canceled, at step 480, or transferred to a different printing device, at step 490. For example, if the printing is canceled, the print job may be canceled and removed from print server 356 or any other printer queue. Further, if moving the document to another printing device is selected, then the print job may remain in pending status in print server 356 or any other printer queue. Information regarding the new printing device may replace the previous printing device information. In some instances, the print job may be removed or canceled in the previous printing device or may be maintained after transfer to the new printing device along with information that the first phase of sample print mode has been completed. In these instances, all information regarding the sample print mode selections is also maintained in the previous printing device.

The following description for FIGS. 5-8 involve one or more exemplary screenshots from a display in a user interface used for printing and reusing a sample set of pages while printing documents. The display may be included in one or more user interfaces, such as GUI 212 described in FIG. 2 or GUI 370 described in FIG. 3. Further, the exemplary screenshots in FIGS. 5-8 will be described in relation to one or more of the steps of process 400 described in FIG. 4. It is important to note that the exemplary screenshots in FIGS. 5-8 may be used in other processes similar to, and/or containing aspects of process 400 in conjunction with printing a reusing a sample set of pages while printing documents.

Figure 5:
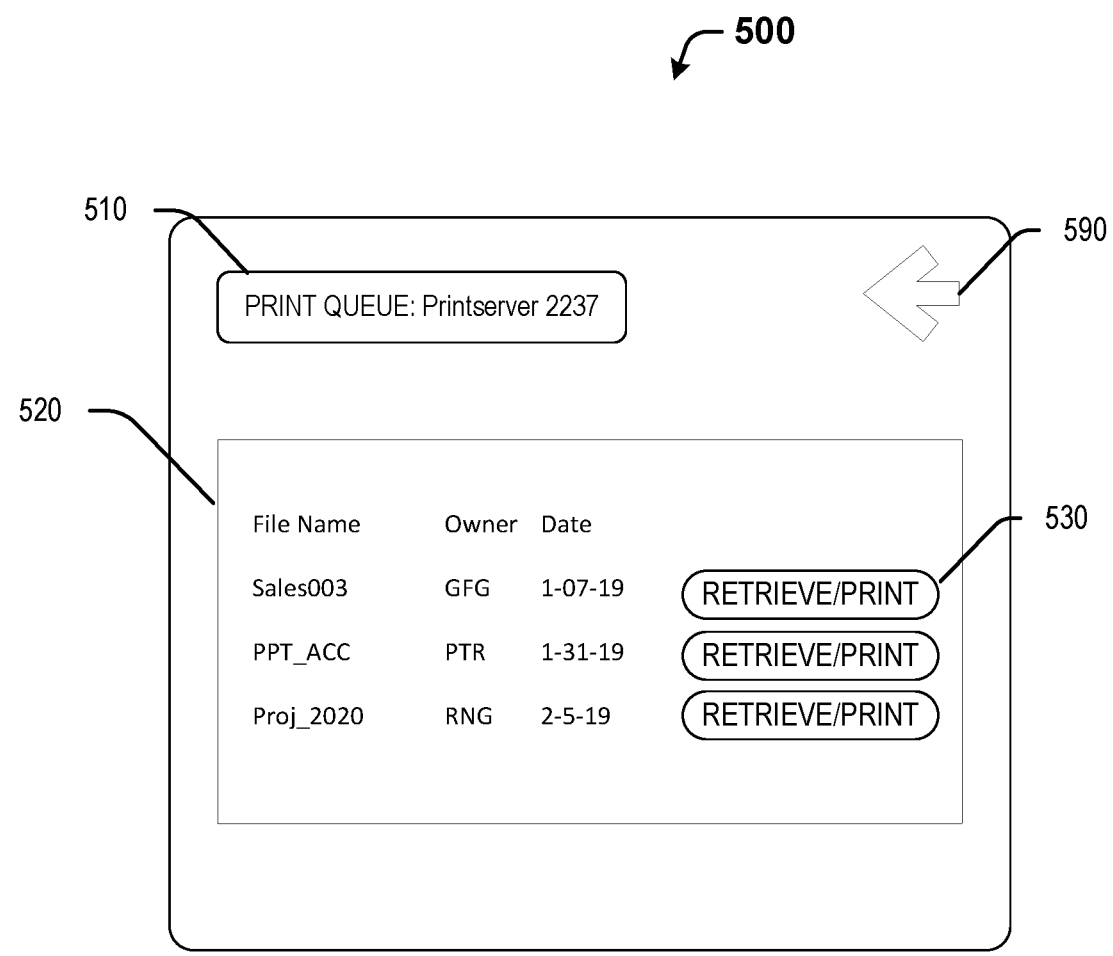
FIG. 5 depicts an exemplary screenshot from a display on a device used for printing and reusing customized sample sets while printing documents.

FIG. 5 depicts an initial electronic document selection screen 500. Selection screen 500 includes an identification of the print queue 510. Print queue 510 may reside in the printing device, such as printing device 200, or may reside in another device, such as user device 300, operatively coupled to the printing device. Selection screen 500 also lists out various details of the different electronic document, identified as files, that are available for download and printing in window 520. The file details may include items such as the filename, the owner of the file, the date the file was last modified, etc. It is important to note that many other items relating to the print queue could be provided in window 520 as are well known to those skilled in the art. Window 520 also includes a form of menu selection input whether currently known or developed in the future, such as radio-style buttons 530, for each of the files in window 520. The selection of one of the files based on a selection input from a user, instructs the printing device to retrieve or request download of the electronic document as a file for a print job, and to begin the process of printing the electronic document. A back arrow 590 is also included to allow for the return to a previous menu. In some embodiments, for selection screen 500, the back arrow 590 returns to a general options screen on the device (e.g., printer device 200 or user device 300).

Figure 6:
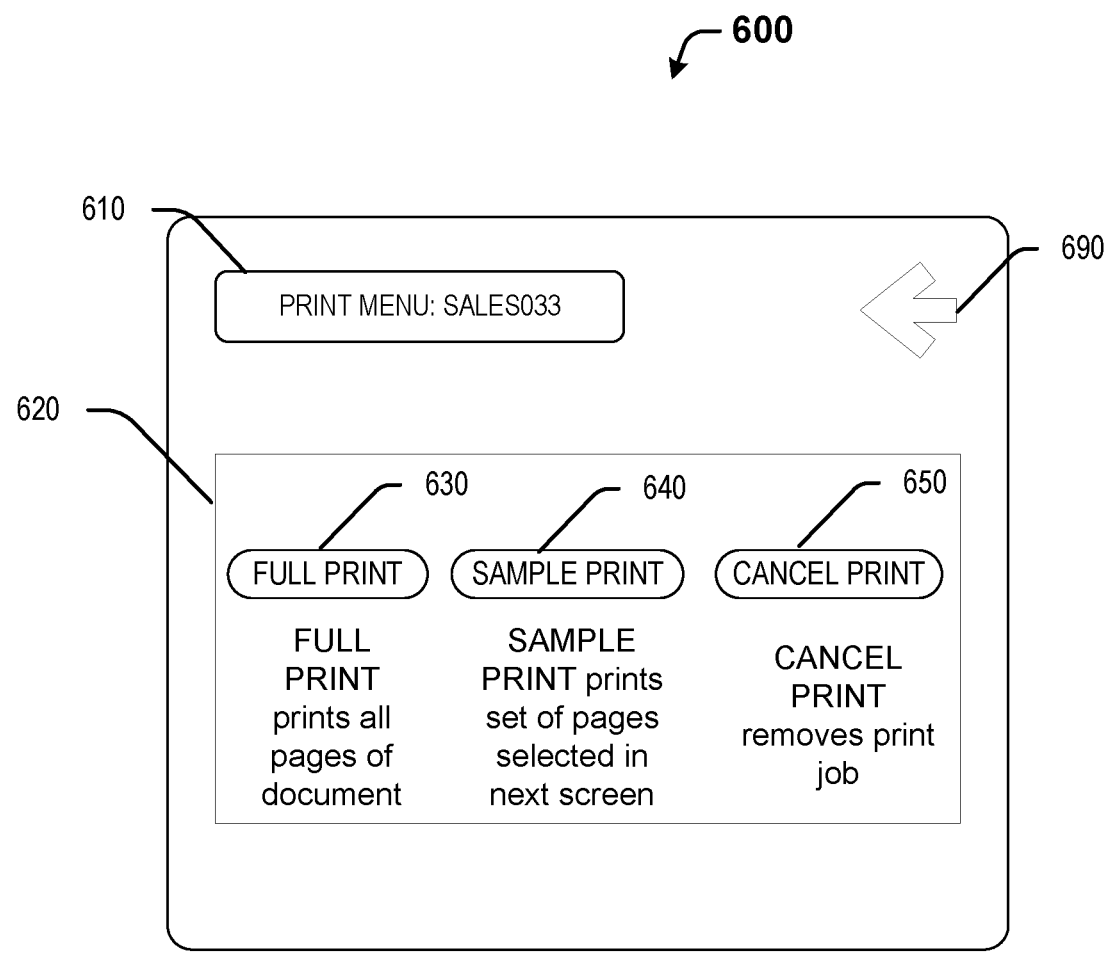
FIG. 6 depicts another exemplary screenshot from a display on a device used for printing and reusing customized sample sets while printing documents.

FIG. 6 depicts a printing options selection screen 600 for the file or electronic document selected using selection screen 500. Options selection screen 600 includes a current status bar 610, indicating the current menu status (PRINT MENU) and the currently selected file or electronic document. Options selection screen 600 further includes a window 620 displaying three options available for selection, along with corresponding selection input, such as radio buttons 630-650. In some embodiments, only one selection from window 620 may be made for a selected file or electronic document, and the operations performed as a result of the selecting one of the selection buttons 630-650 may be mutually exclusive. It is also important to note that more or fewer options may be included for selection in window 620, including additional print options known to those skilled in the art.

Selection button 630 in options selection screen 600 is a full print option, which will print all of the pages of the document. In some embodiments, the full-print option prints any of the pages, fewer than the pages in the entire electronic document, that were selected by a user or print owner as part of establishing the print job. Once the printing is completed, the print job may be removed from the print queue. Selection button 640 is a sample print option, which will print a set of sample pages in a first or sample printing phase based on a selection made in a further screen, described in more detail below.

Selection button 650 in options selection screen 600 is a cancel print option, which will cancel the current process. In some embodiments, the cancel print selection 650 may also remove the print job or print request and may further remove the file or electronic document from the print queue (e.g., print queue in selection screen 500). Further, in some embodiments, the cancel print selection 650 further reverts to displaying a general or main options screen on the device (e.g., printer device 200 or user device 300). Notes may be provided to the user to indicate the operations that will occur for each of the different selection buttons 630-650. The notes may always be displayed on the options selection screen 600, or may only appear when the user hovers the cursor over a specific radio button. Therefore, the notes may be context sensitive. A back arrow 690 is also included to allow for return to a previous menu. In some embodiments, selecting back arrow 690 brings up selection screen 500 on the display.

Figure 7:
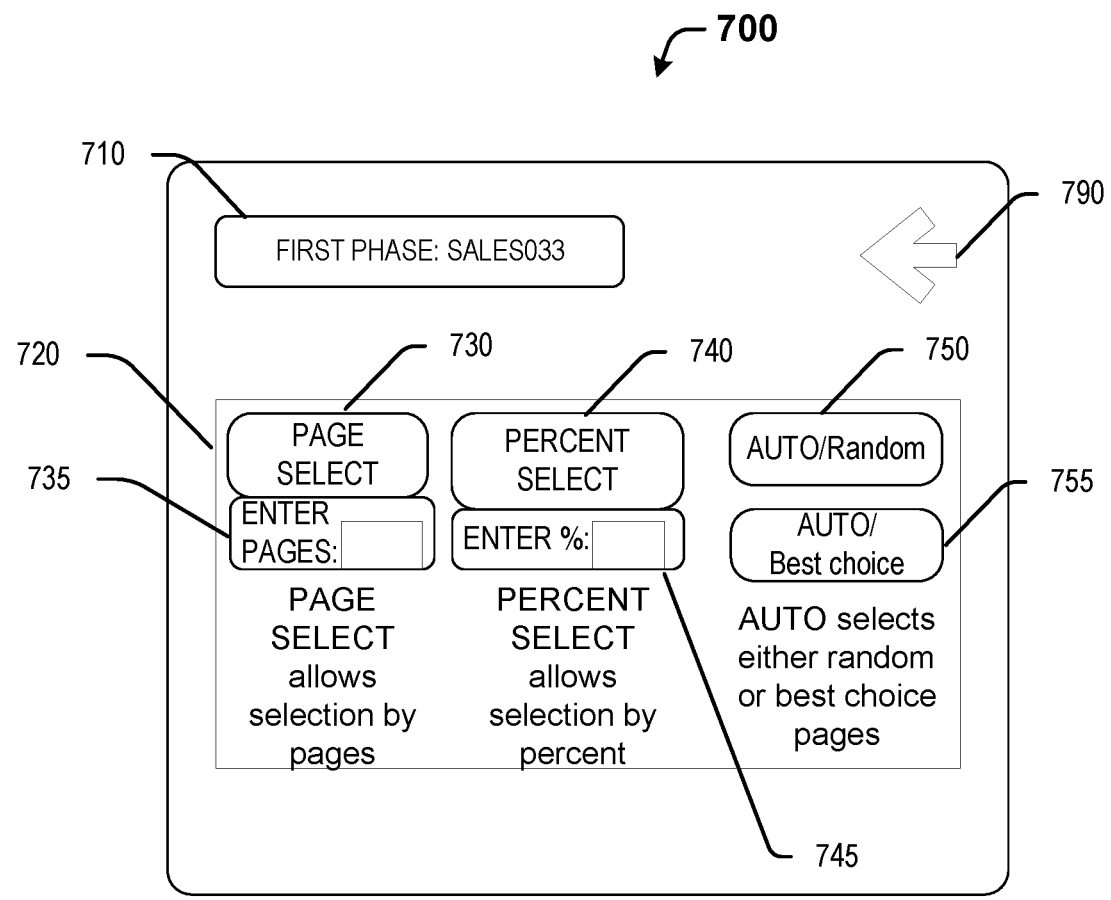
FIG. 7 depicts a further exemplary screenshot from a display on a device used for printing and reusing customized sample sets while printing documents.

FIG. 7 depicts a sample set selection screen 700 for the file or electronic document selected using selection screen 500 when the sample set selection in made in options selection screen 600. Options selection screen 700 includes a current status bar 710, indicating the current menu (FIRST PHASE) and the currently selected file or electronic document. Options selection screen 700 further includes a window 720 displaying three options available for selection, along with corresponding selection input, such as radio selection buttons 730, 740, 750, and 755 along with entry elements 735 and 745. In some embodiments, only one selection from window 720 may be made for a selected file or electronic document, and the operations performed as a result of the selecting on of the selection buttons 730, 740, 750, and 755 may be mutually exclusive. It is also important to note that more or fewer options may be included for selection in window 720.

Selection button 730 in options selection screen 700 is a page select option that allows entry of information for the sample based on pages in the electronic document. In conjunction with the page select option, an entry box 735 is provided for entry of the pages to include in the sample set. In some embodiments, a different entry mechanism, such as radio button selection of specific pages, may be included in addition to, or instead of, entry box 735. Selection button 740 is a percent select option that allows entry of information for the sample based on a percentage of pages in the electronic document. In conjunction with the percent select option, an entry box 745 is provided for entry of the percentage to include in the sample set. In some embodiments, a different entry mechanism, such as radio button selection of specific percentages, may be included in addition to, or instead of, entry box 745. Once the percentage is entered in entry box 745 and the percent select button 740 is selected, the percentage value may be converted to a set of pages for printing as the sample set in the first phase in a manner such as the one described above.

Selection button 750 and selection button 755 in options selection screen 700 are each automatic selection options using a random selection algorithm and a best choice selection algorithm selection respectively. Once either the auto/random button 750 or auto/best choice button 755 is selected, the set of pages for printing as the sample set in the first phase determined using computations and algorithms such as those described above. Notes may be provided for each of the selection buttons in a manner similar to that described earlier. A back arrow 790 is also included to allow for return to a previous menu. In some embodiments, for selection screen 700, the back arrow 790 returns to selection screen 600, to allow selection of a print option for the selected file or electronic document.

Figure 8:
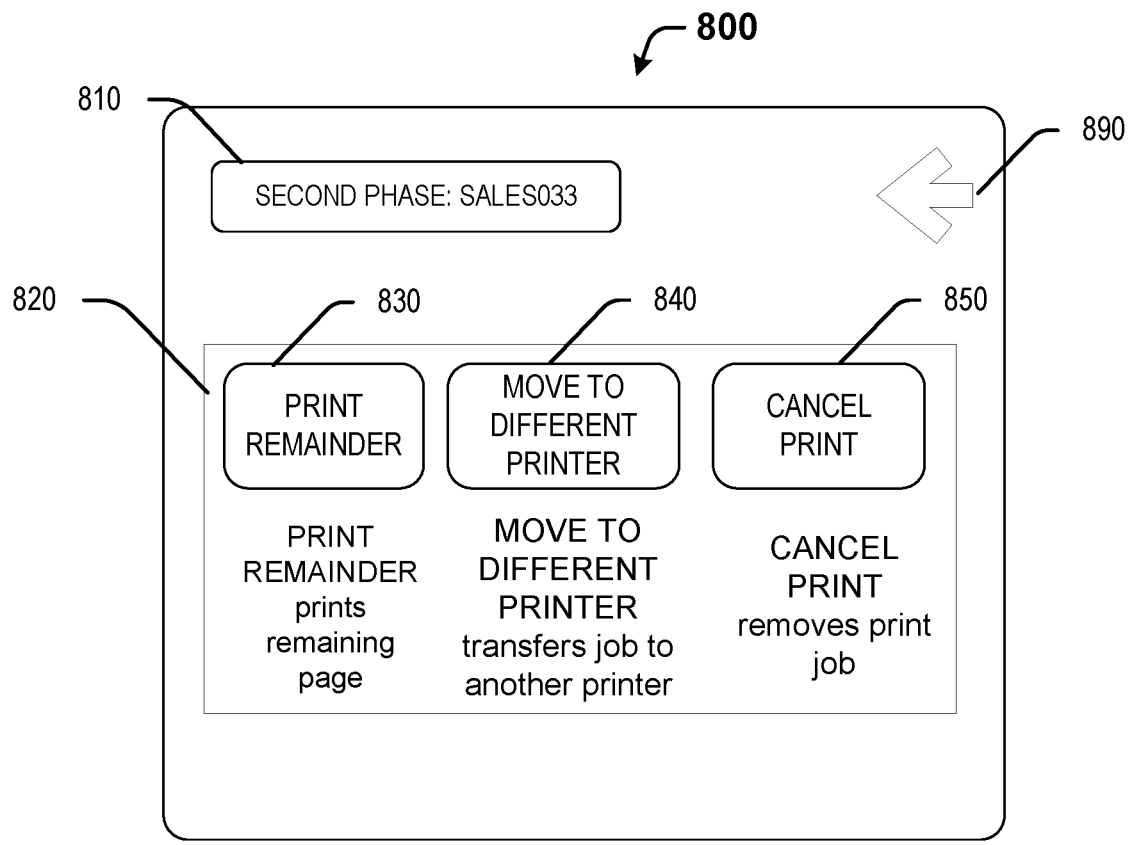
FIG. 8 depicts yet another exemplary screenshot from a display on a device used for printing and reusing customized sample sets while printing documents.

FIG. 8 depicts a further options selection screen 700 for the file or electronic document selected using selection screen 500 after completion of printing the pages in the sample set. Further options selection screen 800 includes a current status bar 810, indicating the current menu (SECOND PHASE) and the currently selected file or electronic document. Options selection screen 800 further includes a window 820 displaying three options available for selection, along with corresponding selection input, such as radio buttons 830-850. In some embodiments, only one selection from window 820 may be made for a selected file or electronic document, and the operations performed as a result of the selecting on of the selection buttons 830-850 may be mutually exclusive. It is also important to note that more or fewer options may be included for selection in window 820.

Selection button 830 in options selection screen 800 is a print remainder option, which will print the remaining pages of the electronic document as part of the second phase printing for the entire document. In some embodiments, when the print job initially includes printing fewer pages than the number of pages of the electronic document based on an input from the user during the initial print request, the print remainder option prints any of the remaining pages requested in the print job and not printed in the first phase. Once the printing of the remaining pages is complete, the print job may be removed from the print queue. In some embodiments, an additional screen (not shown) may be displayed following selection of the print remainder option with selection button 830. The screen instructs a user to insert the printed subset of pages from the first phase of the sample print mode into a media tray holder on the printing device for incorporation with the remaining pages for the electronic document in a manner as described earlier.

Selection button 840 in options selection screen 800 is a move to a different printer option, which allows a print job associated with an electronic document to be transferred to a different printer in a manner such as described in step 490 of process 400. Selection button 850 is a cancel print option, which will cancel the current print process. The selection of the cancel print option with selection button 840 may process the electronic document in a manner similar to that described for step 480 of process 400. Further, in some embodiments, the cancel print selection 850 further reverts to displaying a general or main options screen on the device (e.g., printer device 200 or user device 300). Notes may be provided for each of the selection buttons in a manner similar to that described earlier. A back arrow 890 is also included to allow for return to a previous menu. In some embodiments, selecting back arrow 890 brings up selection screen 600 on the display.

The terms printer, MFD, or printing device as used herein encompasses any apparatus, such as a digital copier, bookmaking machine, facsimile machine, multi-function machine, etc., which performs a print outputting function for any purpose. The details of printers, printing engines, etc., are well-known and are not described in detail herein to keep this disclosure focused on the salient features presented. The systems and methods herein can encompass systems and methods that print in color or monochrome, or handle color or monochrome image data. All foregoing systems and methods are specifically applicable to electrostatographic and/or xerographic machines and/or processes. Further, the terms automated or automatically mean that once a process is started (by a machine or a user), one or more machines perform the process without further input from any user.

While some of the embodiments have been described in the general context of program modules or nodes that execute in conjunction with an application program that runs on an operating system on a computing device, those skilled in the art will recognize that aspects may also be implemented in combination with other program modules or nodes.

Generally, program modules or nodes include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communication network. In a distributed computing environment, program modules may be located in both local and remote memory storage devices.

Some of the embodiments described above may further be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a computer-readable memory device. The computer-readable storage medium can, for example, be implemented via one or more of a volatile computer memory, a non-volatile memory, a hard drive, a flash drive, a floppy disk, or a compact disk, and comparable media.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid-state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

Although embodiments which incorporate the teachings of the present disclosure have been shown and described in detail herein, those skilled in the art can readily devise many other varied embodiments that still incorporate these teachings. Having described preferred embodiments of systems and methods for printing and reusing sample sets while printing documents (which are intended to be illustrative and not limiting), it is noted that modifications and variations can be made by persons skilled in the art in light of the above teachings. It is, therefore, to be understood that changes may be made in the particular embodiments of the disclosure disclosed which are within the scope of the disclosure as outlined by the appended claims.

What is claimed is:

1. A printing apparatus comprising:
    a printing engine configured to print information on a physical readable medium;
    a print processor configured to receive instructions to retrieve an electronic document from a print queue and to process the electronic document in a sample print mode, the electronic document arranged in a plurality of pages, each page containing readable information; and
    a user interface that displays:
        a first message comprising at least one first option for automatically selecting at least one page of the plurality of pages for a subset of the plurality of pages to be printed in a first phase of the sample print mode, wherein the at least one first option comprises a random selection option that automatically selects the at least one page in a random sequence from the plurality of pages using a random selection algorithm;
        a second message comprising at least one second option regarding the printing of the electronic document after the first phase of the sample print mode is complete,
    wherein the print processor is further configured to:
        provide the at least one page of the subset to print using the print engine in the first phase in response to user input based on the at least one first option chosen from the first message; and
        provide remaining pages of the plurality of pages to print using the print engine in a second phase of the sample print mode in response to user input based on at least one second option chosen from the second message.

2. The printing apparatus of claim 1, wherein the second message comprises a user selection menu to select one second option from the at least one second option, the at least one second option comprising one or more of continue printing in a second phase, cancel printing, and transfer printing of the electronic document to a different printer apparatus to begin printing in the first phase of the sample print mode in the different printer apparatus.

3. The printing apparatus of claim 2, wherein the electronic document and information associated with the subset is electronically communicated to the different printer apparatus when the second option to transfer the electronic document to a different printer is selected.

4. The printing apparatus of claim 1, wherein the second message comprises an instruction to insert the printed subset in a page collating mechanism attached to the print engine, and wherein the print engine further collates the subset with remaining pages of the plurality of pages printed in the second phase.

5. The printing apparatus of claim 1, wherein the random selection option selects a pre-defined percentage of the plurality of pages.

6. The printing apparatus of claim 1, wherein the random selection option randomly selects the at least one page from pages comprising one or more of high amounts of marking content, low amounts of white space, a color content, a picture, and text.

7. The printing apparatus of claim 1, wherein the at least one first option further comprises one or more of a percentage selection option, a marking content selection option, a color content selection option, a picture content option, and a text selection option.

8. An apparatus comprising:
    a memory for storing an electronic document, the electronic document arranged in a plurality of pages, each page containing readable information; and
    a processor configured to:
        process the electronic document retrieved from the memory in a sample print mode based on a first user input;
        automatically select at least one page randomly from the plurality of pages using a random selection algorithm to define a subset of the electronic document based on a second user input;
        send instructions to print the subset on a physical readable media in a first phase of the sample print mode; and
        send instructions to print remaining pages of the electronic document on the physical readable media in a second phase of the sample print mode, the instructions being sent in response to a third user input based on a message displayed at completion of printing in the first phase of the sample print mode.

9. The apparatus of claim 8, wherein the displayed message comprises a user selection menu to select one printing option from at least one of continue printing in a second phase, cancel printing, and transfer printing of the electronic document to a different printer apparatus to begin printing in the first phase of the sample print mode in the different printer apparatus.

10. The apparatus of claim 9, wherein the electronic document and information associated with the subset is electronically communicated to the different printer apparatus when the printing option to transfer the electronic document to a different printer is selected.

11. The apparatus of claim 8, wherein the displayed message comprises an instruction to insert the printed subset in a page collating mechanism attached to a print engine, and wherein the processor is further configured to send instructions to collate the subset with remaining pages of the plurality of pages printed in the second phase.

12. A method comprising;
    receiving instructions to retrieve an electronic document, the electronic document arranged in a plurality of pages, each page containing readable information;
    receiving a command to process the electronic document in a sample print mode;

displaying a first message comprising at least one first option on a user interface for automatically selecting at least one page of the plurality of pages for a subset of the plurality of pages to be printed in a first phase of the sample print mode, wherein the at least one first option comprises a random selection option that automatically selects the at least one page in a random sequence from the plurality of pages using a random selection algorithm;

printing the subset on a physical readable media in the sample print mode;

displaying a second message comprising at least one second option on the user interface after completion of the first phase of the sample print mode; and cancelling or printing remaining pages of the electronic document in a second phase on a physical readable media in response to user input based on the displayed message.

13. The method of claim 12, wherein the second message comprises a user selection menu to select one second option from the at least one second option, the at least one second option comprising one or more of continue printing in a second phase, cancel printing, and transfer printing of the electronic document to a different printer apparatus to begin printing in the first phase of the sample print mode in the different printer apparatus.

14. The method of claim 13, wherein the electronic document and information associated with the subset is electronically communicated to the different printer apparatus when the second option to transfer the electronic document to a different printer is selected.

15. The method of claim 12, wherein the second message comprises an instruction to insert the printed subset in a page collating mechanism attached to a print engine, and wherein the method further comprises incorporating the subset with remaining pages printed in the second phase.

16. The method of claim 12, wherein the random selection option selects a pre-defined percentage of the plurality of pages.

17. The method of claim 12, wherein the random selection option randomly selects the at least one page from pages comprising one or more of high amounts of marking content, low amounts of white space, a color content, a picture, and text.

18. The method of claim 12, wherein the at least one first option further comprises one or more of a percentage selection option, a marking content selection option, a color content selection option, a picture content option, and a text selection option.

* * * * *